United States Patent [19]

Sewell et al.

[11] Patent Number: 4,497,332
[45] Date of Patent: Feb. 5, 1985

[54] APPARATUS FOR SERVICING GAS LINES

[75] Inventors: John S. Sewell, Chatham; Frederick A. McColl, Brantford; Peter M. Petkoff, Hamilton, all of Canada

[73] Assignee: Union Gas Limited, Chatham, Canada

[21] Appl. No.: 583,439

[22] Filed: Feb. 24, 1984

[51] Int. Cl.³ .............................................. F16K 43/00
[52] U.S. Cl. .................................... 137/15; 137/315; 137/317; 137/559; 285/18; 285/30; 73/201
[58] Field of Search ............... 137/15, 315, 317, 318, 137/559; 73/201, 262, 272, 273, 274; 285/12, 18, 30

[56] References Cited

U.S. PATENT DOCUMENTS

| | | | |
|---|---|---|---|
| 3,245,257 | 4/1966 | Anderson | 73/201 |
| 3,256,735 | 6/1966 | Smith | 73/201 |
| 3,615,159 | 10/1971 | Munoz | 137/15 |
| 3,946,754 | 3/1976 | Cook | 137/315 |
| 3,995,655 | 12/1976 | Sands | 137/318 |
| 4,127,141 | 11/1978 | Ledonne et al. | 137/318 |
| 4,327,760 | 5/1982 | Lancaster | 137/315 |

Primary Examiner—George L. Walton
Attorney, Agent, or Firm—Feterstonhaugh & Co.

[57] ABSTRACT

An apparatus and method for working on a section of gas main while it is in service comprising a work chamber formable around a section of the gas main and having means for admitting a tool thereto in a manner that it can be manipulated from outside the work chamber; means for removing the tool from the work chamber while maintaining the work chamber under gas pressure and means for safely evacuating the work chamber of gas.

2 Claims, 3 Drawing Figures

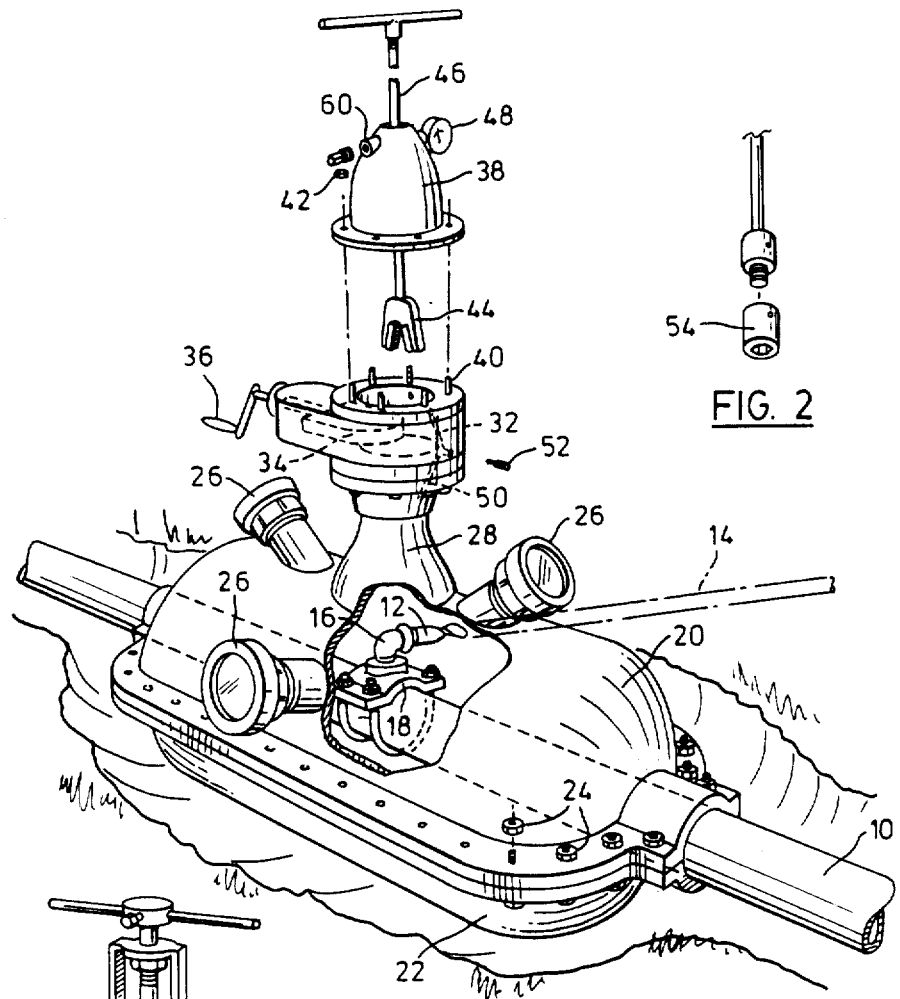
FIG. 2
FIG. 1
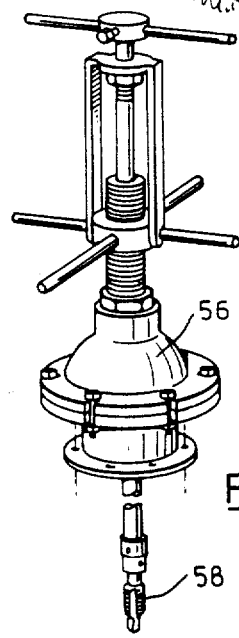
FIG. 3

APPARATUS FOR SERVICING GAS LINES

This invention relates to an apparatus and to a method for removing and applying threaded fittings to a gas main under conditions when the gas main is pressurized.

In the operation of the service of supplying fuel gas such as natural gas to users it is practice to supply the gas to the users through gas mains that extend along a street or highway. Supply to the individual consumers is by way of a service line that communicates with the main through a fitting that is usually screw threaded into a saddle. The saddle is, in turn, bolt clamped to the main and has an opening that communicates with an opening in the main.

When a customer service is to be discontinued it is necessary to remove the supply line. The closure of the supply line in practice is done without depressurizing the main line because it is not practical to interrupt transmission through the main for this purpose.

There are methods for establishing a by-pass flow around the saddle so that the work of removing the saddle can be done safely. These methods are safe but at the same time expensive and time consuming.

Because of the time and expense of these methods, personel of some utilities are doing the job by removing these old saddle fittings, letting the main blow gas through the opening and providing a closure for the opening that results as quickly as they can. The operation is obviously hazardous but in spite of the hazard the method is used for convenience and to avoid expense.

The object of this invention is to avoid the danger of removing a fitting from a main under conditions where it can blow gas into the atmosphere and to provide a method that is inexpensive and apparatus that is easy to use.

An apparatus for servicing a gas conducting main while the main is in service according to this invention comprises a gas-tight work housing for a section of the main to be serviced adapted to define a work chamber around the section of pipe to be serviced; said work housing being formed for through vision from the exterior thereof to the interior work chamber thereof; a tool passage into the work housing through which the working end of a tool can enter the work chamber for manipulation from the exterior of the housing; a tool entry valve in said tool passage, said tool entry valve having a gate operable between open and closed positions to open and close the tool passage to passage of a tool; a tool entry housing mountable on the work housing having a tool entry chamber in communication with the tool passage of the work housing, means for maintaining the tool entry chamber pressurized at the pressure of the gas conducting main; a by-pass valve in said tool passage of said work housing that extends around said tool entry valve in said tool passage; bleed-off vlave communicating with the chamber of said tool entry chamber and the atmosphere; a tool having a working end and a shank that extends from the exterior of the tool entry housing to the interior of the tool entry housing and that is adapted to be extendible through said tool passage into the work chamber of the work housing.

A method for servicing a gas conducting main according to the invention comprises the steps of forming a gas tight work chamber around the main; forming a gas tight tool entry chamber in communication with the gas tight work chamber through a tool entry passage and also through a by-pass passage; providing a tool on the end of a shank, the shank being adapted to extend from the exterior of the tool entry chamber and into the work chamber; manipulating the shank of the tool to locate the tool in the tool chamber; closing the tool entry passage; opening the by-pass passage; venting the tool entry chamber to atmosphere until air is substantially depleted from both of said chambers; closing the tool entry chamber from atmosphere and permitting the pressure to build up therein to line pressure; opening the tool entry passage; manipulating the shank of said tool into the work chamber to service said gas conducting main; manipulating the shank of the tool to back into the tool entry chamber; closing the tool entry passage; venting the tool entry passage and the work chamber to atmosphere.

BRIEF DESCRIPTION OF DRAWINGS

The invention will be further described with reference to the accompanying drawings, in which:

FIG. 1 is a perspective view of the apparatus for servicing gas lines of the present invention.

FIG. 2 is a partial sectioned view of a tool and socket wrench of the apparatus for servicing gas lines as illustrated in FIG. 1.

FIG. 3 is a vertical sectioned view of an alternative tool housing including a tapping device for the apparatus for servicing gas lines as illustrated in FIG. 1.

In the drawings numeral 10 refers to a gas main and numeral 12 refers to a supply line that has been terminated by a conventional line pinching and cutting tool. The broken line 14 refers to the cut off section of the supply line. The supply line has a swing joint 16 that threads into a saddle 18 that is in turn clamp bolted to the main as illustrated. The saddle 18 is in sealed engagement with the main and an opening in the main communicates with an opening in the saddle. This assembly is in common use.

It is desired to remove the swing joint 16 and saddle 18 and then seal the exposed opening in the main with a screw threaded plug.

The service line has been terminated as at 12 to substantially shut off gas flow through the service line at the pinched location. The line in this condition may leak small amounts of gas into the atmosphere but the quantities are not generally considered dangerous.

The next step is to mount the work housing around the main. The housing consists of an upper section 20 and a lower section 22 joined at their respective abutting flanges through which securing bolts 24 are passed. The first step in mounting the housing is to locate the lower section 22, block it in place if necessary, and then to mount and bolt the upper secton 20.

The upper section 20 of the work housing has inspection ports 26 which have windows therein through which the interior of the housing can be viewed when it is mounted on a main. The inspection ports are sealed at their window mountings so that when the chamber of the work housing is pressurized gas cannot escape through the inspection ports. Gaskets are provided at the flanges of the upper and lower parts of the work housing and where the work housing extends around the main 10. Thus, the work housing provides a chamber around the main 10 at the location of the saddle that can be pressurized.

The work housing has a tool passage 28 into the chamber through which the working end of a tool can enter the work chamber and be subject to manipulation from the exterior of the housing. The tool passage 28 has a flange at its upper end upon which a gate valve 32 is bolted. Valve 32 has a gate 34 that can be manipulated between an open and a closed position by operation of the gate handle 36 to open and close off the tool passage as required for the purposes of permitting entry of tools into the work chamber and to permit safe pressurization and depressurization of the work chamber.

A tool housing is mounted on the upper end of the valve 32. Tool housing such as the tool housing 38 has a flange at its lower end with spaced apart holes to receive the mounting bolts 40 on the upper end of valve 32 as the tool housing is dropped onto the valve housing. Nuts are secured to the free ends of the bolts 40 to rigidlly mount the tool housing on the valve in gas tight relation. Gaskets achieve gas tight conditions. In the case of the tool housing 38 a wrench 44 at the free end of a shaft 46 is movable axially of the wrench with a sliding movement through a seal in the upper end of the tool housing. A pressure gauge 48 is mounted on the tool housing and its use will be referred to later.

The valve 32 has a by-pass passage 50 around the gate opening. By-pass passage 50 can be opened and closed by manipulation of the plug element 52.

Other tool housings and other tools can be used. For example, FIG. 2 illustrates a socket wrench that can be used to remove or tighten the nuts that maintain the saddle mounted on the main. Wrench 54 can be mounted on the shank of the tool in the tool holder 46 to replace the wrench 44 previously described.

FIG. 3 shows a further housing that can be applied to the valve similarly to the tool housing 38 just described. This alternative tool housing 56 incorporates a tapping device generally indicated by the numeral 58. As will be explained, once the saddle 18 has been removed it is often desired to tap the hole in the main with a screw thread so that a plug can be screwed into the main to close the opening.

In using the apparatus described one would first pinch off the service line 14 as indicated at numeral 12 in FIG. 1 and cut the service line 14 from the pinched section. The free end of the cut main would be cleared from the work site and the tool housing would be mounted on the main as described. Once mounted it provides a chamber that can be made gas tight.

The valve 32 in the open position is then located on the chamber and bolted into position. Following that the tool housing 38 is bolted onto the valve. All assemblies are gas tight at their locations of mounting and the tool chamber is gas tight at the point of entry of the tool shank as insured by an appropriate seal that extends around the shank.

The tool, the wrench 44, for example, is in the withdrawn or upper portion of the housing.

At this stage there may be a small amount of gas leaking from the severed service line into the chamber. The internal by-pass 50 is opened to provide a passage around the gate valve 34; gate valve 34 is operated to a closed position; and bleeder opening 60 in the tool housing is opened.

It will be appreciated tht as gas enters the work chamber 20 it passes through the by-pass 50 that extends around the closed valve 34, into the chamber of the tool entry fitting 38 and out the open vent 60. Upon initial mounting of the tool entry chamber 38 there is a considerable amount of air in the work chamber and system generally. Gas does escape in small amounts from the sealed over cut off portion of the severed service line 12. As the gas escapes it evacuates the air in the system through the vent 60. When pure gas is emerging from the vent 60 one knows that all air has been exhausted from the system. At this stage the vent 60 is closed by insertion of a plug and the pressure in the system commences to build up. It will eventually reach line pressure and the achivement of line pressure in the system is determined by the pressure gauge 48.

When the pressure in the tool entry chamber 38 is at line pressure the gate valve 34 is opened by location of the handle 36 to clear the opening through the valve to permit passage of the tool 44. The shank of the tool is dropped to cause the wrench 44 to engage the swing joint 16 and turn the swing joint to thread it outwardly of and remove it from the saddle.

One then withdraws the wrench 18 into the tool chamber 38, closes the valve 32 and the by-pass valve 52. The pressure in the tool housing is reduced to atmospheric by opening the vent 60.

The tool housing is removed; a fresh tool such as the wrench 54 is applied to the tool housing and the housing is remounted on the valve. The vent 60 is closed and the pressure is built up again to line pressure in the tool housing by opening the by-pass valve 62. The wrench is dropped to remove the nuts from the saddle clamps and permit the saddle to fall off the main.

During all of this work the operator can view progress through anyone of the opening ports 26.

The tool is withdrawn again after removal of the saddle and the housing 38 depressurized and removed. A housing 56 with a tapping attachment is then mounted on the valve in place of the tool housing 38. Similarly, this housing is pressurized and the valve 32 opened to permit the tap to drop into the work chamber 20 to tap the opening in the main left by removal of the saddle.

By similar procedure a nut or cap is threaded into the threaded opening to close it.

When the work is completed the tool entry chamber is depressurized, the work chamber is depressurized by opening by-pass valve 52 and the unit removed from the main. It will be apparent that any kind of tool that might be required for the achievement of a particular job within the work chamber can be used and the invention is not particularly concerned with the type of tool that is mounted on the end of the shank 46 or the tapping attachment.

The normal gas line pressures are in the order of 60 pounds per square inch, but these will vary depending upon practice.

Embodiments of the invention other than the one illustrated will be apparent to those skilled in the art and it is not intended that the invention be restricted to the embodiment herein illustrated.

The embodiment of the invention in which an exclusive property or privilege is claimed are defined as follows:

1. Apparatus for servicing a pressurized gas main by interrupting and reestablishing the mechanical continuity of the pressurized gas conducting main without interrupting gas flow therethrough including gas main service tools comprising:

a gas-tight work housing for a section of the main to be serviced adapted to define a work chamber around the section of pipe to be serviced;

said work housing being formed for vision of the interior work chamber thereof from the exterior thereof;

a tool passage into the work housing through which the working end of a gas main service tool can enter the work chamber for manipulation from the exterior of the housing;

a tool entry housing mountable on the work housing having a tool entry chamber for communication with the tool passage of the work housing;

a tool entry valve in said tool passage, said tool entry valve having a gate operable between open and closed positions to open and seal the work chamber and tool entry chamber with respect to each other through the tool passage and to open and close the tool passage to passage of the working end of a gas main service tool;

a by-pass a passage in said work housing that extends around said tool entry valve in said tool passage of the work housing;

a bleed-off valve communicating with the chamber of said tool entry chamber for selectively venting and sealing the tool entry chamber to atmosphere;

a bypass valve in said bypass passage for selectively venting the work chamber to the tool entry chamber to achieve pressurization of the tool entry chamber when the tool is retracted up from the work chamber when the bypass valve is opened and the gate valve is closed and to maintain pressurization of the work chamber independently of the tool entry chamber when the bypass valve and the gate valve are closed a gas main service tool having a working end adapted to operatively engage the gas main to perform service thereon and a shank extending from the working end, the shank having a length that is long enough to extned through the work chamber, tool passage, tool entry housing and externally of the tool entry housing whereby in use an end of the shank can be manipulated exteriorly of the tool entry housing to operatively engage the gas main within the work chamber with the working end of the tool, from its retracted position when the gate valve is opened to allow equal pressurization of the work chamber and the tool entry chamber the shank of the tool being reciprocatingly mounted in sealed relation with a wall of the tool entry housing.

2. A method of servicing a pressurized gas main by interrupting and reestablishing the mechanical continuity of the pressurized gas conducting main without interrupting gas flow therethrough by the use of gas main service tools comprising the steps of:

(a) forming a gas tight work chamber around the main;

(b) forming a gas tight service tool entry chamber in communication with the gas tight work chamber through a service tool entry passage and also through a by-pass passage around the tool entry passage;

(c) providing a service tool having a working end and a shank extending from the working end, the shank extending from the exterior of the tool entry chamber and into the work chamber;

(d) manipulating the shank of the tool from the exterior of the tool entry chamber to locate the tool in the tool entry chamber;

(e) closing the tool entry passage;

(f) opening the by-pass passage;

(g) permitting the gas main to leak gas at a slow rate;

(h) venting the tool entry chamber to atmosphere until air is substantially depleted from the work chamber and the tool entry chamber;

(i) closing the tool entry chamber from atmosphere and permitting gas to leak from the main to cause the pressure to build up to line pressure in the work chamber and the tool entry chamber;

(j) opening the tool entry passage after the pressure has built up to line pressure;

(k) manipulating the shank of said service tool into the work chamber to cause the working end thereof to operatively engage with the gas main and perform a tool function on the gas main;

(l) manipulating the shank of the service tool to withdraw the working end thereof into the tool entry chamber;

(m) closing the tool entry passage and the by-pass passage;

(n) venting the tool entry passage to atmosphere;

(o) modifying the service tool in the tool entry chamber by changing the nature of the working end thereof;

(p) opening the by-pass passage to exclude air from the tool entry chamber;

(q) closing the tool entry chamber from atmosphere and permitting the pressure to build up therein to line pressure;

(r) opening the tool entry passage;

(s) manipulating the shank of the service tool into the work chamber to cause the working end thereof to operatively engage with the gas main and perform a tool function on the gas main (t) repeating from steps (k) to (r) above recited as often as required to perform the intended work on the gas main except that with the last repetition will include only steps (l) to (m);

(u) and after the last repetition opening the by-pass and venting the tool entry chamber to atmosphere until gas is substantially exhausted from the work chamber;

(v) the said steps of removing the tool from the work chamber to the entry chamber and modifying the service tool and admitting the service tool to the work chamber being repeated as many times as there are separate operations to be performed on the gas main with a service tool.

* * * * *